Patented Apr. 16, 1940

2,196,974

UNITED STATES PATENT OFFICE 2,196,974

BONDED MATERIAL AND METHOD OF MAKING

Willis A. Boughton, Cambridge, and William R. Mansfield, Boston, Mass., assignors, by mesne assignments, to New England Mica Company, Waltham, Mass., a corporation of Massachusetts No Drawing. Application August 8, 1938, Serial No. 223,721

48 Claims. (Cl. 154—2.6)

This invention relates to improvements in the manufacture of products bonded with bonding compounds that are subjected to high temperatures to effect the bonding. Such compounds are particularly useful in the art of bonding, binding, or cementing surfaces of particles which are non-reacting therewith, and non-soluble therein, thereby effecting the integration of discrete particles of matter into practically unitary bodies.

In the following description of the invention disclosed herein, reference is made specifically to the manufacture of laminated mica insulation products; but it must be understood that the application of the properties, principles, and methods disclosed therein may be made to other uses and materials, for example, the impregnation and bonding into unitary products of inorganic fibrous materials such as asbestos, spun glass, slag wool, with or without other heat-resisting matter. Other applications of the invention will be obvious to those skilled in arts where high-temperature adhesives are desirable.

One object of the invention is to produce bonded materials the binders of which shall exhibit a thermal behavior such that at red heat they will flow and effect adherence of adjacent surfaces, and on cooling form clear, hard, glass-like substances, characterized by a high degree of adhesion to adjacent surfaces and resilient when in the form of a film between such surfaces; shall be essentially unaltered upon repeated subjection thereafter to temperatures of red-ness and upon exposure to conditions of high relative humidity; shall possess high electrical insulation resistance values at high temperatures and at high relative humidities; and shall be non-charring, non-combustible and fire-proofing.

A further object is to produce bonded materials embodying high-temperature binders having properties which make them especially beneficial in the manufacture of laminated mica plate for use primarily as insulation in electric heater appliances, but also in various other types of electric devices.

A further object of the invention relates to the production of other composite insulating materials bonded or impregnated with the fused reaction product of one or the other of the several binder compounds described herein.

Further objects of the invention will be apparent to those skilled in the related arts after reading this specification.

Composite high temperature-resistant mica plate has attained a position of distinct and increasing importance in the field of electrical insulation by virtue of its availability in large sheets having uniformity of quality and dimensions and adaptability to more efficient assembling processes. In spite of the fairly old art of manufacturing composite mica plate an extremely limited number of inorganic bonding compounds have been found to be capable of use, and none thus far available exhibits all of the requisite properties or desirable features embraced in this invention.

The trend in electric heater appliances to higher temperatures of operation, greater heat-up speeds and thermostatic operation, together with the requirement of specified maximum current leakages to eliminate shock hazard, has placed an increasingly greater burden on the insulation. In order to satisfy the assembly and operating conditions of the element units of electric heater appliances, the insulation must possess a high degree of mechanical integration to permit free punching, notching, and element winding; must be capable of repeated subjection to the operating temperatures of the appliance essentially without physical or chemical changes; and must exhibit an electrical insulation resistance sufficiently high to eliminate the possibility of shock hazard at the operating conditions of the appliance.

The requirements of one of the leading American safety associations for the approval of domestic electric heater appliances include—

(A) The resistance (impedance) of the insulation shall be of a value such that with the application of 120 volts, 60 cycles, between the electrical circuit and the frame of the appliance, the leakage current will not exceed 0.2 milliampere under each of the following conditions:

(1) Initially, as received, at existing test-room temperature and humidity.

(2) After exposure for 24 hours to an atmosphere of at least 85% relative humidity and 85° F., and while still under those conditions.

(3) At operating temperature after one hour of continuous operation, thermostatic cycling.

(B) Insulation must be of such a character as not only to be adequate initially but also to have the necessary expectance of life with adequate performance.

In the development of suitable binders it has become necessary, therefore, to consider the electrical insulation resistance both at high temperatures and after exposure to high relative humidities, as well as the effect of these condtions upon the mechanical integration of the products bonded therewith.

In our co-pending application filed August 8, 1938, Ser. No. 223,718 for Bonding compounds we show that boron trioxide, when used as a binder under the conditions of manufacture of high-temperature-resistant mica plate, either alone or in combination with only lead oxide, exhibits a partial or marked failure to fuse to a clear glassy mica-adhesive form because the residual opacity involves inadequate adhesion and clarity of the binder and inadequate hardness and mechanical integration of the bonded product. We show in said application that these deleterious properties are not only overcome by the addition of boron trioxide of fluorine-containing compounds, but as a result the use of boron trioxide as a binder is greatly improved, and further that in the presence of a fluorine-containing compound, then silicious materials or lead compounds, or both, may also be incorporated with the development of further improvement in the qualities of the binder.

The binders as thus modified universally exhibit a common essential of improvement in that they fuse completely at temperatures of redness to yield bonded mica plates of excellent hardness, adhesion, clarity, mechanical integration and high electrical insulation resistance.

In our co-pending application filed August 8, 1938, Ser. No. 223,720 for Bonded materials and method of making we show that bonding compounds comprising the fused or glass-like reaction products of the mono alkali metal and the ammonium orthophosphates, namely, metaphosphoric acid and the alkali metal metaphosphates (hereinafter referred to as "metaphosphate"), or (b) such "metaphosphate" with the fused forms of the alkali metal borates, namely, the fused alkali metal borates, monoborates and metaborates (hereinafter referred to as "fused borate"), and boron trioxide will, on treatment as hereinafter described, yield bonded products which exhibit both high electrical insulation resistance and excellent durability or resistance to physical and chemical change both at high temperatures and at high relative humidities.

We have noted in said applications that while mica plates bonded at fusing temperatures with "metaphosphate" or a mixture of "metaphosphate" and "fused borate" alone, exhibit excellent moisture-resistance they have inadequate electrical insulation resistance, and that while mica plates bonded with fused boron trioxide alone, exhibit high electrical insulation resistance they have inadequate durability upon exposure to high relative humidities. Thus, although neither the glass-like "metaphosphate" or mixture of "metaphosphate" and "fused borate" nor boron trioxide is individually capable of fulfilling the modern requirements, binders containing both components within certain limits of proportion do produce composite mica plate fully able to satisfy the requirements specified and desired for the insulation of domestic electric heater appliances and for other purposes.

We have discovered that compositions comprising "metaphosphate" or mixtures of "metaphosphate" and "fused borate" in combination with boron trioxide may be further improved by modification of the incorporated boron trioxide as described in our said co-pending application for Bonding compounds Serial Number 223,718, above noted.

The resulting glass-like substances formed by fusion of these compositions at high temperature differ from the true glasses in the following particulars:

(a) They are adhesive to mica when in a fused state, whereas all low melting commercial glasses that we have been able to obtain show marked lack of the necessary adhesion.

(b) The thermal coefficients of expansion of the fused compositions are close to that of mica, while those of the low melting glasses are so different from that of mica that when fused in contact therewith and cooled the glass cracks, and the plate is correspondingly imperfect.

(c) The bonding efficiency of the major constituent in the bonding composition is enhanced by the presence of the other components, whereas ordinary glasses appear to have no major component that is, alone, essentially a mica adhesive; and no combination of components has been found in which any one factor has a noticeable effect of enhancing the adhesion of glass to mica, with the possible exception of fluorine compounds occasionally employed, which, however, in the common glasses tried fail to have sufficient effect to permit the use of glass as an efficient mica binder.

(d) The flowing point of the melted binder is distinctly lower and is in the range of the decomposition temperature of mica itself, while the so-called low melting glasses of commerce tried thus far still melt only at temperatures higher than the decomposition temperature of India mica itself.

This invention is intended to include, therefore, bonding compositions comprising one or more components selected from each of the following groups A and B:

GROUP A (1) Fused metaphosphoric acid or the glass-like metaphosphates of the alkali metal group, or compounds which yield fused metaphosphoric acid or the glass-like alkali metal metaphosphates at high temperatures.

(2) Mixtures of fused metaphosphoric acid or the glass-like alkali metal metaphosphates with the glass-like forms of the fused borates, monoborates or metaborates of the alkali metal group, or compounds which yield these glass-like fused forms at high temperatures.

GROUP B

Boron trioxide, or compounds such as boric acid which at red heat yield a residue composed of boron trioxide, modified by the addition of—
(1) A fluorine-containing compound, or
(2) A fluorine-containing compound and a silica-containing material, or
(3) A fluorine-containing compound and a lead-containing compound, or
(4) A fluorine-containing compound, a silica-containing material and a lead-containing compound.

The fused glass-like "metaphosphate" may be first prepared separately and incorporated as such in the binder formulas; or their formation may be effected directly in the mica plate during manufacture by first incorporating in the bonding compositions salts which yield the fused "metaphosphate" at the temperature of manufacture of the bonded mica plate. The ammonium orthophosphates, for example, yield metaphosphoric acid when heated to the temperature range of manufacture of high temperature-resistant bonded mica plate. It is highly improbable that any trace of ammonia remains in the high temperature fusion products of the ammonium orthophosphates, and it is our belief that a fused glass-like metaphosphoric acid, rather than an oxide of phosphorus, is formed. In confirmation of this belief we have found that metaphosphoric acid itself may be used in place of an ammonium orthophosphate in the original bonding composition, without esential change in the results obtained.

It is well known that the monobasic alkali metal orthophosphates and the alkali metal-ammonium orthophosphates yield the glass-like alkali metal metaphosphates at the manufacturing temperatures of the bonded mica plate. Therefore, in the original bonding composition we may use one or more components selected from the group consisting of the ammonium orthophosphates, the monobasic alkali metal orthophosphates, the alkali metal-ammonium orthophosphates, metaphosphoric acid and the alkali metal metaphosphates.

The term "alkali metal borate" is intended to include one or more components selected from the group consisting of the glass-like forms of the fused borates, monoborates and metaborates of the alkali metal group, and salts which yield these glass-like or fused forms at high temperatures. These fused forms may be prepared separately and incorporated in the original bonding compositions, or their formation may be effected directly in the process of manufacture of the bonded mica plate with fused bond by first incorporating in the composition as applied to the mica films, salts which yield these glass-like forms at the manufacturing temperature of the mica plate. For example, crystallized borax may be used as one component in the original bonding composition to yield a fused sodium borate in the finished composite product. In the tabulated series crystallized borax has been used as the alkali metal borate component because all of the bonded mica plates in these particular series were made with India mica films and at a manufacturing temperature of approximately 575°–625° C. (1067°–1157° F.). When potassium and lithium borates are used, higher temperatures are required to effect fusion. These may, therefore, be advantageously used with Amber mica which has a higher decomposition temperature than India mica.

The term "alkali metal component" hereinafter referred to, is meant to include the "metaphosphate" component or the mixture of "metaphosphate" and "fused borate" in the fused bonding compositions, or the salts, in the unfused bonding compositions which yield these fused forms.

Boron trioxide may be used as such in the preliminary binder formula, as made up for use, or its formation may be effected directly in the process of manufacture of the mica plate by first incorporating in the composition as applied to the mica films one or more thermally-decomposable boron trioxide-forming compounds, such as boric acid, in part or entirely for boron trioxide; such compounds decompose chemically and leave a residue composed of boron trioxide when heated to the manufacturing temperature of the mica plate. In the claims herewith we have, for simplicity, consistently named boron trioxide as typical of the component of the composition which supplies this substance with the intent however that such claims shall include within their scope not only boron trioxide itself but also all useful equivalents thereof, for example any thermally-decomposable boron trioxide-forming compound as well as any desired combination of such materials.

The boron trioxide modifiers comprise the following types, the percentages representing the proportions of the total modified boron trioxide group or the boron trioxide component of the compositions as defined above.

(1) About 1% to about 20% of hydrofluoric acid, hydrofluosilicic acid, or an alkali metal or ammonium salt of one or both of these acids.

(2) About 1% to about 20% of hydrofluoric acid, hydrofluosilicic acid, or an alkali metal or ammonium salt of one or both of these acids, together with about 1% to about 33% of a silicious material.

(3) About 1% to about 20% of hydrofluoric acid, hydrofluosilicic acid, or an alkali metal or ammonium salt of one or both of these acids, together with about 1% to about 20% of a lead compound.

(4) About 1% to about 20% of hydrofluoric acid, hydrofluosilicic acid, or an alkali metal or ammonium salt of one or both of these acids, about 1% to about 40% of a silicious material, and about 1% to about 20% of a lead compound.

It is in the addition and presence of these boron trioxide modifiers that the compositions embraced in this invention differ from and constitute improvement over the compositions described in our said co-pending application Bonded materials and method of making, Serial Number 223,720, above noted. Briefly, the fluorine-containing compound produces in each modification a fluxing or clarifying effect upon boron trioxide, effecting adequate fluidity and complete fusion to a clear, glass-like mica-adhesive form, thus effecting improved hardness, adhesion, clarity, and mechanical integration, as well as increased electrical insulation resistance in composite mica plates bonded therewith. The silicious compound is believed to function to maintain and stabilize the fluxing temperature of the compositions at a correct temperature, and to effect additional increase in the electrical insulation resistance of the bonding agents and bonded products. The lead compound is believed to serve to produce increased hardness and greater resistance to physical and chemical change upon exposure to moisture. In addition to the specific effect of improvement of the individual modifiers, they appear to function collectively to produce still greater improvement in increased hardness and moisture-resistance.

As the silicious component we may elect to use powdered or precipitated silica, preferably silicic acid, or a powdered mineral silicate such as feldspar, or an aqueous solution of a soluble silicate such as potassium silicate.

As the lead compound we prefer to use red lead oxide, but other lead-oxygen-containing salts such as the nitrate, and carbonate, may be used; or in place of individual lead and fluorine-containing compounds, we may use lead fluoride, or lead silicofluoride; or for the lead compound we may substitute the oxide of some other heavy metal such as that of tin, arsenic, antimony, or bismuth.

In the construction of the mica plate, we may apply the binder composition which may consist of the unfused mixed components or which may be a pre-fused reaction product, between the mica films as a dry powder, as a paste, in aqueous solution, or dispersed or dissolved in an aqueous or organic solvent or mixture of solvents. Thereafter the mica plate so constructed is heated, and the fusion reaction effect in situ producing the reaction product bonding agent during the manufacture of the bonded plate.

In manufacturing the high temperature mica plate the assembly constructed as above is, as a preliminary step, first treated for removal of the solvent or dispersing medium by heating to a suitable temperature, ordinarily 60° C.–70° C. (140° F.–158° F.), under reduced pressure in a vacuum oven. This removal of the solvent or suspending medium, partial if aqueous and complete if organic, is preparatory to the final fusion reaction of the bonding composition used. The degree of vacuum and the heat treatment must be so related as to liberate the vapors in such a gentle way that the structure of the mica plate, i. e. the overlapping relation and flat position of its films remains unchanged at the end of this treatment. Some water may remain without being deleterious to the final fusion reaction but when an organic dispersing medium is used the solvent should be entirely removed at this stage in order to prevent the later formation of a charred residue, such as yielded by glycerine and its compounds, in the fused mica plate.

After this treatment the mica plate is subjected to temperatures of redness and to suitable compression to effect the chemical and physical changes necessary to produce the mechanical integration, thermal stability and other properties required of high-temperature-resistant mica plate.

In the improved bonded insulating materials embraced in this invention we have, therefore, incorporated several specific and distinct improvements. When these herein described modifications of previously developed bonding mixtures are utilized in the manufacture of bonded insulating materials they produce collectively such improved binders that all of the present conditions of safety, assembly, use and operation now required of insulation at high temperatures are adequately fulfilled. With respect to high temperature-resistant bonded mica plate, they exhibit improved flowing, distribution, and fusion of the binders at the temperature of manufacture to yield after fusion, and ready for commercial use, clear glass-like binders of high adhesive power and of high electrical insulation resistance value and excellent physical and chemical resistance to alteration after subjection to temperatures of redness and after exposure to conditions of high relative humidity. The mica plates bonded therewith are hard, clear, and mechanically well integrated, exhibit high electrical insulation resistances and durability both at high temperatures and upon exposure to high relative humidities.

In the tabulation the binder compositions are given for the mixtures, expressed in percentages of each component by weight, used for application to the mica films in constructing the mica plate, and before fusion; the electrical resistance and current leakage values represent measurements made on the mica plates bonded with these compositions after fusion, that is, after heating the composite mica plates to temperatures of redness and subjecting them to adequate applied pressures, and cooling under pressure.

In our thermal tests we measured the electrical insulation resistance of 10 square inches of the test mica plate, 0.015" in thickness, in a test clamp designed for the purpose. The resistances, which are expressed in megohms at 500 volts D. C., are absolute only for the specific conditions of the tests and serve, therefore, only as a basis for comparison. The measurements were made during heating up to 650° C. (1202° F.) and while the mica plate was kept at 650° C. for 15 minutes, the tabulated values being the minimum electrical insulation resistance measured at any time during the test.

Table I shows the electrical resistances of mica plates bonded with various typical improved compositions and illustrates the improvement effected by the incorporation of the various boron trioxide modifiers into the compositions, as well as the increase in resistance with higher proportions of the boron trioxide component.

TABLE I

*Electrical insulation resistances of fused bonded mica plates at 650° C. (1202° F.)*

(FORMULAS GIVEN FOR BINDER COMPOSITIONS, EXPRESSED IN PERCENTAGES BY WEIGHT, BEFORE FUSION

| Alkali metal phosphate | Borax $Na_2B_4O_7$ + $10H_2O$ | Boron trioxide $B_2O_3$ | Silicious component | Lead oxygen compound | Fluorine compound | Elec. ins. res. in megohms |
|---|---|---|---|---|---|---|
| 17.5 $NH_4H_2PO_4$ | 29.5 | 53.0 | | | | 0.207 |
| 17.45 $NH_4H_2PO_4$ | 29.0 | 52.35 | | | 1.2 $NH_4F.HF$ | 0.256 |
| 17.45 $NH_4H_2PO_4$ | 29.0 | 52.35 | | | 1.2 $(NH_4)_2SiF_6$ | 0.224 |
| 17.25 $NH_4H_2PO_4$ | 28.75 | 51.70 | 1.15 silicic acid | | 1.15 $NH_4F.HF$ | 0.293 |
| 16.85 $NH_4H_2PO_4$ | 28.10 | 50.55 | | 2.25 | 2.25 $NH_4F.HF$ | 0.266 |
| 17.12 $NH_4H_2PO_4$ | 28.55 | 51.33 | 1.0 blanc rouge | 1.0 | 1.0 $NH_4F.HF$ | 0.293 |
| 16.85 $NH_4H_2PO_4$ | 28.10 | 50.55 | 1.125 silicic acid | 2.25 | 1.125 $NH_4F.HF$ | 0.326 |
| 22.25 $KNH_4H_4(PO_4)_2$ | 22.5 | 45.0 | 5.5 silicic acid | 2.25 | 2.25 $NH_4F.HF$ | 0.374 |
| 42.5 $NaH_2PO_4.H_2O$ | 8.5 | 42.5 | 4.0 blanc rouge | 2.0 | 1.0 $NH_4F.HF$ | 0.726 |

In our tests for determining the electrical insulation resistances of mica plates at conditions of high relative humidities with high summer temperatures, we measured current leakage after exposure of the test mica plates, 0.015" in thickness, in a humidity chamber to conditions of 85% relative humidity and 85° F. (29.4° C.) for 24 hours. The current leakage measurements, which are expressed in milliamperes at 115 volts A. C., serve (reciprocally) as an index of electrical insulation resistance. The tabulated values are absolute only for the specific conditions of test and serve, therefore, only as a basis for comparison.

The results of Table II are typical of these improved compositions and illustrate the effect of the incorporation of the various boron trioxide modifiers in the compositions in decreasing the current leakage of the fused bonded mica plates at high relative humidity.

integration and durability. They are essentially unaltered upon repeated subjection to red heat

TABLE II

Current leakages of fused bonded mica plates at 85% relative humidity and 85° F. (29.4° C.)

(FORMULAS GIVEN FOR BINDER COMPOSITIONS, EXPRESSED IN PERCENTAGES BY WEIGHT, BEFORE FUSION)

| Alkali metal phosphate | Borax $Na_2B_4O_7$ + $10H_2O$ | Boron trioxide $B_2O_3$ | Silicious component | Lead oxygen compound | Fluorine compound | Current leakage in milliamperes |
|---|---|---|---|---|---|---|
| 17.5 $NH_4H_2PO_4$ | 29.5 | 53.0 | | | | 0.24 |
| 17.45 $NH_4H_2PO_4$ | 29.0 | 52.35 | | | 1.2 $NH_4F.HF$ | 0.055 |
| 17.45 $NH_4H_2PO_4$ | 29.0 | 52.35 | | | 1.2 $(NH_4)_2SiF_6$ | 0.075 |
| 17.25 $NH_4H_2PO_4$ | 28.75 | 51.7 | 1.15 silicic acid | | 1.15 $NH_4F.HF$ | 0.10 |
| 17.05 $NH_4H_2PO_4$ | 28.40 | 51.15 | | 2.27 | 1.13 $NH_4F.HF$ | 0.14 |
| 16.85 $NH_4H_2PO_4$ | 28.10 | 50.55 | 1.125 silicic acid | 2.25 | 1.125 $NH_4F.HF$ | 0.115 |

The tables refer specifically to the effect of these modified improved compositions upon the electrical insulation resistance of mica plates bonded with them, both at high temperatures and after exposure to high relative humidities. However, it is to be understood that the compositions must in every case, regardless of proportions, satisfy also the other recognized requirements for binders for high temperature-resistance mica plates, as described among the objects and in the subject matter of this specification.

Thus, it is necessary that the bonded mica insulation, in order to satisfy the assembly and operating conditions of the element units of electric heater appliances, must possess a high degree of mechanical hardness and integration to permit free punching, notching and element winding. In order to effect this integration, the bonding agents must exhibit a thermal behavior such that they will flow at red heat and on cooling under compression, form clear, hard but resilient, glass-like films of a high degree of adhesion to adjacent mica surfaces.

Another property of any inorganic bonding agent in use as a binder for high temperature-resistant bonded mica plate is that it must show a low thermal coefficient of expansion, not greatly different from that of mica itself at all temperatures up to and including temperatures of redness, in order to prevent cracking, buckling and disruption of the mica plate when it is heated to and cooled under pressure from red heat during manufacture and in appliances. In this discussion, therefore, when we mention a good mica plate or mica binder we mean, among others, that this criterion also has been observed.

Another important consideration is the durability, or mechanical stability, of the fused bonded mica plates. When used in domestic electric heater appliances the insulation must not only be adequate initially but also have the necessary expectancy of life with adequate performance. Durability of the insulation involves the maintenance of mechanical hardness and structural integration of adhesion of the binder, and of resistance of the binder to physical and chemical change when the insulation is repeatedly subjected to temperatures of redness or exposed to conditions of high relative humidities.

The improved bonding agents herein described have been found to satisfy all of the specified criteria for binders for high temperature-resistant mica plate, and the fused mica plates bonded with these agents exhibit excellent mechanical integration and durability. They are essentially unaltered upon repeated subjection to red heat and upon exposure to conditions of high relative humidity.

In the consideration of durability we have determined that in the fused mixtures the boron trioxide component is the factor of improvement in thermal resistance and that the alkali metal component is the factor of improvement in moisture-resistance. Suitable proportions have been employed to combine the desired improvement in both factors of durability or resistance to physical and chemical changes, namely, upon subjection to high temperatures and after exposure to high relative humidities, and thus to obtain adequate durability of the integrated insulation.

The actual proportions and natures of the binder components in formulas used commercially are based upon the specific conditions of assembly, operation and the use to which the bonded insulation may be subsequently applied. For example, if the product is intended for use in an appliance operating at unusually high temperatures, as in many electric flatirons, one or more of the higher-melting alkali metal phosphates or alkali metal borates may be used. If the design of the appliance is such that it is conducive to high current leakage, as in certain types of space heaters, higher proportions of the boron trioxide component may be used to reduce current leakage to a minimum. If the product is to be used in appliances where the insulation may be exposed to high humidities, higher proportions of the alkali metal component are required to protect the mica plate from deterioration by reason of the environmental humidity. The limitations of proportion are, then, those set by the need for adequate electrical insulation resistance on the one hand, and adequate thermal-resistance and moisture-resistance on the other.

In the course of many experiments we have determined that the unfused-bonding compositions may preferably contain from about 20% to about 80% of either the alkali metal component or the boron trioxide component, depending upon the conditions of operation and the use to which the bonded product is to be applied. Satisfactory bonding compositions as described herein have, however, been made with the alkali metal component as low as 10%, with a corresponding increase in the percentage of the boron trioxide component; however, the optimum range of percentage for most uses lies between about 35% and about 55% of the alkali metal component in the unfused bonding composition.

With the type of binder described in this specification the exact temperature of manufacture is determined by the composition of the binder, particularly the temperature required to effect fusion of the specific alkali metal component used and its proportion in the composition.

However, the temperature of manufacture should be below but as near as practicable to the decomposition temperature of the mica films themselves, in order to obtain maximum fusion, adhesion, dehydration, and resulting thermal resistance of the binder and to obtain in the mica plate these qualities most essential in subsequent conditions of assembly, use and operation. Manufacturing temperatures between 580° C. (1075° F.) and 650° C. (1202° F.) have been used with India mica (Muscovite) films, while with Amber mica (Phlogopite) films, temperatures up to 870° C. (1600° F.) have been employed.

The percentages given in the tables are not to be taken as representing specific or optimum limitations, but rather as demonstrating the range of optimum proportions. Higher and lower proportions in the ranges given for the various components also often yield effective improvement with regard to special requirements for use.

When the term "unfused bonding components" or "unfused bonding composition" is used in the specification or claims, it is intended to mean the binder components or composition as used initially in the construction of the mica plate and which subsequently serve, when the mica plate is heated to the fusion temperatures and compressed, as the source of the actual high temperature reaction product bonding agent which functions to bond the mica films and layers to produce a completely integrated composite mica plate. The "unfused bonding components" or "unfused bonding composition", which may be pre-fused, as described above, exhibit only a partial adhesion or bonding action in the initially-constructed mica plate, the fusion conditions of temperature and pressure being required to produce the complete bonding qualities required in the finished mica plate.

Although the invention has been described with particular emphasis upon the use of these compositions as binders for mica films, it is readily apparent that their usefulness may be extended to various types of insulating materials.

The preceding description relates to the preferred embodiments of the invention. Minor changes in details or combinations with suitable other binders are intended to be included in the spirit and scope of this invention.

We claim:

1. The method of making a composite bonded insulating material, which comprises associating discrete matter with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) an alkali metal borate component, (3) a boron trioxide component, and (4) a fluorine-containing component, subjecting said associated discrete matter and unfused bonding composition to a temperature sufficient to effect thermal reaction of the components of said unfused bonding composition, and thereby to obtain a fused reaction product, capable of and bonding said discrete matter under pressure into an integral body with said fused reaction product formed in situ, and cooling under pressure the bonded composite product thus obtained.

2. The method of making a composite bonded insulating material, which comprises associating discrete matter with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) a boron trioxide component and (3) a fluorine-containing component, subjecting said associated discrete matter and unfused bonding composition to a temperature sufficient to effect thermal reaction of the components of said unfused bonding composition, thereby to obtain a fused reaction product capable of and bonding said discrete matter under pressure into an integral body with said fused reaction product formed in situ, and cooling under pressure the bonded composite product thus obtained.

3. The method of making a composite bonded insulating material, which comprises associating discrete matter with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) an alkali metal borate component, (3) a boron trioxide component, (4) a fluorine-containing component, and (5) at least one component selected from the group consisting of silica-containing materials and heavy metal-oxygen compounds, subjecting said associated discrete matter and unfused bonding composition to a temperature sufficient to effect thermal reaction of the components of said unfused bonding composition, thereby to obtain a fused reaction product, capable of and bonding said discrete matter under pressure into an integral body with said fused reaction product formed in situ, and cooling under pressure the bonded composite product thus obtained.

4. The method of making a composite bonded insulating material, which comprises associating discrete matter with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) a boron trioxide component, (3) a fluorine-containing component, and (4) at least one component selected from the group consisting of silica-containing materials and heavy metal-oxygen compounds, subjecting said associated discrete matter and unfused bonding composition to a temperature sufficient to effect thermal reaction of the components of said unfused bonding composition, thereby to obtain a fused reaction product capable of and bonding said discrete matter under pressure into an integral body with said fused reaction product formed in situ, and cooling under pressure the bonded composite product thus obtained.

5. The method of making a composite bonded insulating material, in accordance with claim 1, in which the discrete matter consists of flake material.

6. The method of making a composite bonded insulating material, in accordance with claim 1, in which the discrete matter consists of mica flakes, and the unfused bonding composition contains (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound.

7. The method of making a composite bonded insulating material, in accordance with claim 2, in which the discrete matter consists of flake material.

8. The method of making a composite bonded insulating material, in accordance with claim 2, in which the discrete matter consists of mica flakes, and the unfused bonding composition contains (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound.

9. The method of making a composite bonded insulating material, in accordance with claim 3, in which the discrete matter consists of mica flakes, and the unfused bonding composition contains (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 33 percent of a silica-containing material.

10. The method of making a composite bonded insulating material, in accordance with claim 3, in which the discrete matter consists of mica flakes, and the unfused bonding composition contains (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 20 percent of a heavy metal-oxygen compound.

11. The method of making a composite bonded insulating material, in accordance with claim 3, in which the discrete matter consists of mica flakes, and the unfused bonding composition contains (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 20 percent of red lead oxide.

12. The method of making a composite bonded insulating material, in accordance with claim 3, in which the discrete matter consists of mica flakes, and the unfused bonding composition contains (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 40 percent of a silica-containing material, and by from about 1 percent upwards to about 20 percent of a heavy metal-oxygen compound.

13. The method of making a composite bonded insulating material, in accordance with claim 3, in which the discrete matter consists of mica flakes, and the unfused bonding composition contains (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 40 percent of a silica-containing material and by from about 1 percent upwards to about 20 percent of red lead oxide.

14. The method of making a composite bonded insulating material, in accordance with claim 4, in which the discrete matter consists of mica flakes, and the unfused bonding composition contains (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 33 percent of a silica-containing material.

15. The method of making a composite bonded insulating material, in accordance with claim 4, in which the discrete matter consists of mica flakes, and the unfused bonding composition contains (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 20 percent of a heavy metal-oxygen compound.

16. The method of making a composite bonded insulating material, in accordance with claim 4, in which the discrete matter consists of mica flakes, and the unfused bonding composition contains (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 20 percent of red lead oxide.

17. The method of making a composite bonded insulating material, in accordance with claim 4, in which the discrete matter consists of mica flakes, and the unfused bonding composition contains (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 40 percent of a silica-containing material and by from about 1 percent upwards to about 20 percent of a heavy metal-oxygen compound.

18. The method of making a composite bonded insulating material, in accordance with claim 4, in which the discrete matter consists of mica flakes, and the unfused bonding composition contains (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 40 percent of a silica-containing material and by from about 1 percent upwards to about 20 percent of red lead oxide.

19. The composite bonded insulating material resulting from subjecting to reaction temperature and pressure mica flakes associated with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) an alkali metal borate component, (3) a boron trioxide component, and (4) a fluorine-containing component.

20. The composite bonded insulating material resulting from subjecting to reaction temperature and pressure mica flakes associated with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) a boron trioxide component, and (3) a fluorine-containing component.

21. The composite bonded insulating material resulting from subjecting to reaction temperature and pressure mica flakes associated with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) an alkali metal borate component, (3) a boron trioxide component, (4) a fluorine-containing component, and (5) at least one component selected from the group consisting of silica-containing materials and heavy metal-oxygen compounds.

22. The composite bonded insulating material resulting from subjecting to reaction temperature and pressure mica flakes associated with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) a boron trioxide component, (3) a fluorine-containing component, and (4) at least one component selected from the group consisting of silica-containing materials and heavy metal-oxygen compounds.

23. The composite bonded insulaitng material, in accordance with claim 19, in which the fluorine-containing component consists of fluorine combined with a radical selected from the group consisting of the radicals hydrogen, alkali metal, and ammonium.

24. The composite bonded insulating material, in accordance with claim 19, in which the fluorine-containing component consists of a fluo-silicon compound containing a radical selected from the group consisting of the radicals hydrogen, alkali metal, and ammonium.

25. The composite bonded insulating material, in accordance with claim 19, in which the fluorine-containing component is ammonium acid fluoride.

26. The composite bonded insulating material, in accordance with claim 20, in which the fluorine-containing component consists of fluorine combined with a radical selected from the group consisting of the radicals hydrogen, alkali metal, and ammonium.

27. The composite bonded insulating material, in accordance with claim 20, in which the fluorine-containing component consists of a fluo-silicon compound containing a radical selected from the group consisting of the radicals hydrogen, alkali metal, and ammonium.

28. The composite bonded insulating material, in accordance with claim 20, in which the fluorine-containing component is ammonium acid fluoride.

29. The composite bonded insulating material, in accordance with claim 21, in which the silica-containing material is selected from the group consisting of silica, silicic acid, the mineral silicates and the water-soluble silicates and metasilicates.

30. The composite bonded insulating material, in accordance with claim 21, in which the silica-containing material is silicic acid.

31. The composite bonded insulating material, in accordance with claim 21, in which the heavy metal-oxygen compound is selected from the group consisting of the oxides of lead, tin, arsenic, antimony and bismuth.

32. The composite bonded insulating material, in accordance with claim 21, in which the heavy metal-oxygen compound is red lead oxide.

33. The composite bonded insulating material, in accordance with claim 22, in which the silica-containing material is selected from the group consisting of silica, silicic acid, the mineral silicates, and the water-soluble silicates and metasilicates.

34. The composite bonded insulating material, in accordance with claim 22, in which the silica-containing material is silicic acid.

35. The composite bonded insulating material, in accordance with claim 22, in which the heavy metal-oxygen compound is selected from the group consisting of the oxide of lead, tin, arsenic, antimony, and bismuth.

36. The composite bonded insulating material, in accordance with claim 22, in which the heavy metal-oxygen compound is red lead oxide.

37. The composite bonded insulating material resulting from subjecting to reaction temperature and pressure mica flakes associated with an unfused bonding composition containing (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound.

38. The composite bonded insulating material resulting from subjecting to reaction temperature and pressure mica flakes associated with an unfused bonding composition containing (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound.

39. The composite bonded insulating material resulting from subjecting to reaction temperature and pressure mica flakes associated with an unfused bonding composition containing (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 33 percent of a silica-containing material.

40. The composite bonded insulating material resulting from subjecting to reaction temperature and pressure mica flakes associated with an unfused bonding composition containing (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and (2) from about 80 percent downwards to about 20 percent of a boron trioxide component modified by from about 1 percent upwards to about 20 percent of a fluorine-containing compound and by from about 1 percent upwards to about 20 percent of a lead-oxygen compound.

41. The composite bonded insulating material resulting from subjecting to reaction temperature and pressure mica flakes associated with an unfused bonding composition containing (1) from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates (b) and an alkali metal borate component, and (2) from about 80 percent downwards to about 20 percent of a boron trioxide component modified by from about 1 percent upwards to about 20 percent of a fluorine-containing compound, by from about 1 percent upwards to about 40 percent of a silica-containing material and by from about 1 percent upwards to about 20 percent of a lead-oxygen compound.

42. The composite bonded insulating material resulting from subjecting to reaction temperature and pressure mica flakes associated with an unfused bonding composition containing (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 33 percent of a silica-containing material.

43. The composite bonded insulating material resulting from subjecting to reaction temperature and pressure mica flakes associated with an unfused bonding composition containing (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, and (2) from about 80 percent downwards to about 20 percent of a boron trioxide component modified by from about 1 percent upwards to about 20 percent of a fluorine-containing compound and by from about 1 percent upwards to about 20 percent of a lead-oxygen compound.

44. The composite bonded insulating material resulting from subjecting to reaction temperature and pressure mica flakes associated with an unfused bonding composition containing (1) from about 20 percent upwards to about 80 percent of at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates, (2) from about 80 percent downwards to about 20 percent of a boron trioxide component modified by from about 1 percent upwards to about 20 percent of a fluorine-containing compound by from about 1 percent upwards to about 40 percent of a silica-containing material, and by from about 1 percent upwards to about 20 percent of a lead-oxygen compound.

45. The composite bonded insulating material, in accordance with claim 41, in which the unfused bonding composition contains (1) between from about 15 percent to about 35 percent of mono-ammonium phosphate, (2) between from about 20 percent to about 40 percent of borax, (3) between from about 65 percent to about 45 percent of boron trioxide, (4) beween from about 1 percent to about 5 percent of ammonium acid fluoride, (5) between from about 1 percent to about 5 percent of silicic acid, and (6) between from about 1 percent to about 5 percent of red lead oxide.

46. The composite bonded insulating material, in accordance with claim 41, in which the unfused bonding composition contains (1) between from about 10 percent to about 35 percent of mono-ammonium phosphate, (2) between from about 5 percent to about 15 percent of mono-sodium phosphate, (3) between from about 65 percent to about 45 percent of boron trioxide, (4) between from about 1 percent to about 5 percent of ammonium acid fluoride, (5) between from about 1 percent to about 5 percent of silicic acid, and (6) between from about 1 percent to about 5 percent of red lead oxide.

47. The composite bonded insulating material, in accordance with claim 44, in which the unfused bonding composition contains (1) between from about 35 percent to about 55 percent of mono-ammonium phosphate, (2) between from about 65 percent to about 45 percent of boron trioxide, (3) between from about 1 percent to about 5 percent of ammonium acid fluoride, (4) between from about 1 percent to about 5 percent of silicic acid, and (5) between from about 1 percent to about 5 percent of red lead oxide.

48. The composite bonded insulating material, in accordance with claim 44, in which the unfused bonding composition contains (1) between from about 15 percent to about 35 percent of mono-ammonium phosphate, (2) between from about 20 percent to about 40 percent of mono sodium phosphate, (3) between from about 65 percent to about 45 percent of boron trioxide, (4) between from about 1 percent to about 5 percent of ammonium acid fluoride, (5) between from about 1 percent to about 5 percent of silicic acid, (6) between and from about 1 percent to about 5 percent of red lead oxide.

WILLIS A. BOUGHTON.
WILLIAM R. MANSFIELD.